US009014975B2

(12) United States Patent
Brashear et al.

(10) Patent No.: US 9,014,975 B2
(45) Date of Patent: Apr. 21, 2015

(54) SYSTEM ON A CHIP INERTIAL NAVIGATION SYSTEM

(71) Applicant: VectorNav Technologies, LLC, Richardson, TX (US)

(72) Inventors: John Brashear, Dallas, TX (US); Jeff Cheek, Plano, TX (US); Jeremy Davis, Dallas, TX (US); James Doebbler, Wylie, TX (US); Lasse Maeland, Plano, TX (US)

(73) Assignee: VectorNav Technologies, LLC, Richardson, TX (US)

( * ) Notice: Subject to any disclaimer, the term of this patent is extended or adjusted under 35 U.S.C. 154(b) by 55 days.

(21) Appl. No.: 13/901,146

(22) Filed: May 23, 2013

(65) Prior Publication Data

US 2013/0317741 A1    Nov. 28, 2013

Related U.S. Application Data

(60) Provisional application No. 61/650,879, filed on May 23, 2012.

(51) Int. Cl.
*G01C 21/00* (2006.01)
*G01C 21/16* (2006.01)

(52) U.S. Cl.
CPC .................................... *G01C 21/165* (2013.01)

(58) Field of Classification Search
CPC ....................................................... G01C 21/165
USPC ................................................. 701/472, 500
See application file for complete search history.

(56) References Cited

U.S. PATENT DOCUMENTS

| 5,392,650 | A  | * | 2/1995  | O'Brien et al. | 73/514.18  |
|-----------|----|---|---------|----------------|------------|
| 5,654,717 | A  | * | 8/1997  | Nichols et al. | 342/357.31 |
| 5,796,001 | A  | * | 8/1998  | Greiff et al.  | 73/504.16  |
| 6,166,627 | A  | * | 12/2000 | Reeley         | 340/426.25 |
| 6,315,062 | B1 | * | 11/2001 | Alft et al.    | 175/45     |
| 6,950,022 | B2 | * | 9/2005  | Breed          | 340/552    |
| 7,613,567 | B2 | * | 11/2009 | Hashiba        | 701/505    |
| 7,978,065 | B2 | * | 7/2011  | Schnitz et al. | 340/539.13 |
| 8,258,942 | B1 | * | 9/2012  | Lanzone et al. | 340/539.13 |
| 8,307,535 | B2 | * | 11/2012 | Feller et al.  | 29/600     |
| 8,384,538 | B2 | * | 2/2013  | Breed          | 340/500    |
| 2002/0005297 | A1 | * | 1/2002 | Alft et al. | 175/26 |
| 2003/0087470 | A1 | * | 5/2003 | Linke       | 438/64 |
| 2003/0111268 | A1 | * | 6/2003 | Alft et al. | 175/73 |
| 2004/0190374 | A1 | * | 9/2004 | Alft et al. | 367/14 |
| 2005/0173153 | A1 | * | 8/2005 | Alft et al. | 175/46 |
| 2006/0247854 | A1 | * | 11/2006 | Esaki et al. | 701/210 |
| 2007/0240903 | A1 | * | 10/2007 | Alft et al. | 175/50 |
| 2009/0201203 | A1 | * | 8/2009 | Le Sage et al. | 342/357.12 |
| 2011/0054733 | A1 | * | 3/2011 | Kong et al. | 701/34 |
| 2012/0123638 | A1 | * | 5/2012 | Bechtel et al. | 701/36 |

* cited by examiner

*Primary Examiner* — Mary Cheung
*Assistant Examiner* — Frederick Brushaber
(74) *Attorney, Agent, or Firm* — McGuireWoods LLP (57) ABSTRACT

A system on a chip and a method for inertial navigation. The system includes a printed circuit board (PCB) on a single plane. The PCB includes a number of sensors configured to measure position, acceleration, angular rate, magnetic fields, pressure, and temperature measurements. The PCB also includes one or more processors in communications with the number of sensors configured to process the measurements to output a position, velocity, attitude, and acceleration.

20 Claims, 7 Drawing Sheets

SYSTEM ON A CHIP INERTIAL NAVIGATION SYSTEM

CROSS REFERENCE TO RELATED APPLICATIONS

This application claims priority to U.S. Provisional Patent Application Ser. No. 61/650,879 filed on May 23, 2012 entitled SYSTEM ON A CHIP INERTIAL NAVIGATION SYSTEM the entire teachings of which are incorporated herein.

BACKGROUND OF THE INVENTION

Utilization of sensory information has grown nearly exponentially in recent years. Despite the advances in technology, many sensory systems still require a substantial or three dimensional space in circuits or systems. The comparatively large volumetric space is required to take different measurements and for the different types of sensory systems. As a result, the sensors, such as location and orientation sensors, are not utilized in many devices that may benefit from the additional information. Alternatively, the sensors may be utilized in bulky and inefficient packaging or systems that require extensive wiring or communications hardware.

SUMMARY OF THE INVENTION

The illustrative embodiments are in the technical field of inertial navigation. More particularly, the illustrative embodiments are in the technical field of inertial navigation using microelectromechanical systems (MEMS) technology. The described sensors may be integrated on a singular plane and may be embedded into a printed circuit board.

One embodiment provides a system on a chip and a method for inertial navigation. The system may include a printed circuit board (PCB) on a single plane. The PCB may include a number of sensors configured to measure position, acceleration, angular rate, magnetic fields, pressure, and temperature measurements. The PCB may also include one or more processors in communications with the number of sensors configured to process the measurements to output a position, velocity, attitude, and acceleration.

Another embodiment provides a navigation system on a chip. The navigation system may include a number of sensors configured to process sensor measurements including at least one or more gyroscopes, one or more accelerometers, one or more magnetometers, a GNSS receiver, one or more pressure sensors, and one or more temperature sensors. The navigation system may include one or more microprocessors configured to process the measurements by performing compensation for the number of sensors utilizing one or more conditions of the navigation system, dynamic filtering of the measurements, and tuning of the measurements. One or more microprocessors output a position, velocity, attitude, and acceleration.

Yet another embodiment provides a method for providing navigation information utilizing a navigation system-on-a-chip. Measurements are received from a number of sensors including at least one or more gyroscopes, one or more accelerometers, one or more magnetometers, a global navigation satellite system, one or more pressure sensors, and one or more temperature sensors. Delay compensation is performed for the measurements. Tuning is performed for the measurements. The measurements are filtered to output an attitude, position, and velocity.

BRIEF DESCRIPTION OF THE DRAWING OF THE INVENTION

DETAILED DESCRIPTION OF THE DRAWING OF THE INVENTION

The illustrative embodiments provide a system, method, and chip for inertial navigation. For example, inertial navigation may be performed utilizing micro electromechanical systems (MEMS). An inertial navigation system (INS) is a navigation system that uses a computer/processor, motion sensors (e.g. accelerometers, gyroscopes, etc.) to continuously calculate the position, rates of rotation, attitude (orientation), and velocity (direction and speed of movement) of a moving object without the need for external references. For example, the navigation system may utilize dead reckoning to perform the calculations and measurements. In one embodiment, a System on a Chip (SoC) Inertial Navigation System is an inertial navigation system that combines the elements of an inertial navigation system on a single integrated circuit (IC), chip, or component.

Previously, accelerometers and gyroscopes have only been available as single axis or 2-axis components, being able to measure acceleration or angular rate on a single, one-dimensional plane (e.g. x and y plane). Inertial navigation systems that employed these components needed to incorporate a vertical plane perpendicular to the board the components were mounted on so that the system could also measure acceleration and angular rate on the z axis in addition to the x and y axis. For example, the described embodiments may be thin enough to function as a surface mount device that can be soldered onto a host PCB, connected, or integrated. For example, the system may be as thin as 0.1 mm to 1 cm or even thinner depending on the various applications (e.g. packaging, pins, electrodes or connectors, substrate, wafer thickness, etc.).

In one embodiment, MEMS are utilized to generate a SoC INS possible by combining a 3-axis accelerometer or 3-axis gyroscope into a single package. As a result, the inertial navigation system may be installed or manufactured directly onto a printed circuit board (PCB), wire wraps, point-to-point constructs, or other assemblies. The MEMs components may be combined with a global navigation satellite system (GNSS) module, barometric pressure sensor, temperature sensor, or other possible components on a singular plane. Other sensing components that may be integrated into the SoC may include, but are not limited to, indoor navigation or other indoor range and range rate sensors or detectors, ultra-wide band and other radio frequency based positioning systems, humidity sensor(s), laser or ultrasonic range and or range rate sensors, cameras or image based sensors, and so forth. In addition to the sensor components integrated into the SoC, the SoC may also utilize measurements, in analog or digital form, from sensing components external to the device that may include, but are not limited to, pitot tubes or other airspeed indicator, linear or angular encoders, water speed indicators, and so forth.

The advantages of the illustrative embodiments may include, without limitation, that the system may be mounted (or processes implemented), manufactured, or deeply embedded in devices, or components, such as a printed circuit board (PCB), where traditional inertial navigation systems may not be mountable or embedded. The system-on-a-chip configuration of the illustrative embodiment may have a reduced three-dimensional footprint and be more light-weight permitting applications that were previously inhibited by dimensional and/or mass constraints.

One embodiment may utilize a singular plane configuration. The embodiments may not require a three-dimensional structure to support the components, thereby allowing for greater resistance to shock. In addition, the illustrative embodiments do not require a three-dimensional structure to support the required components and may be deeply embedded within a user's system, allowing for quicker and more efficient integration time and implementation into various devices, systems, and electrical components. The illustrative embodiments may also consume less power than other, three-dimensional designs, permitting applications previously inhibited by such constraints.

The illustrative embodiments may be implemented in robotics, consumer electronics, medical devices, aerospace, marine, entertainment, and military devices and systems. For example, the illustrative embodiments may be utilized in air and ground vehicles (manned or unmanned), navigation heads up displays, body motion capture systems, human exoskeletons, guided munitions, camera and antenna stabilization, surveying, mining, and consumer electronics. For example, the illustrative embodiments may be mounted or embedded in unmanned aerial vehicles, robotics, remotely operated vehicles and other such applications in which there is a need to obtain estimates for inertial attitude, position and/or velocity where size, weight, power, shock resistance, ability to directly embed, integration time and/or ease of implementation are critical factors for use.

The illustrative embodiments may provide an inertial navigation system capable of providing estimates of inertial attitude, position, and velocity in a system on a chip configuration. For example, the navigation system may be embedded onto a PCB for obtaining such inertial attitude, position, and velocity estimates and measurements.

Figure 1:
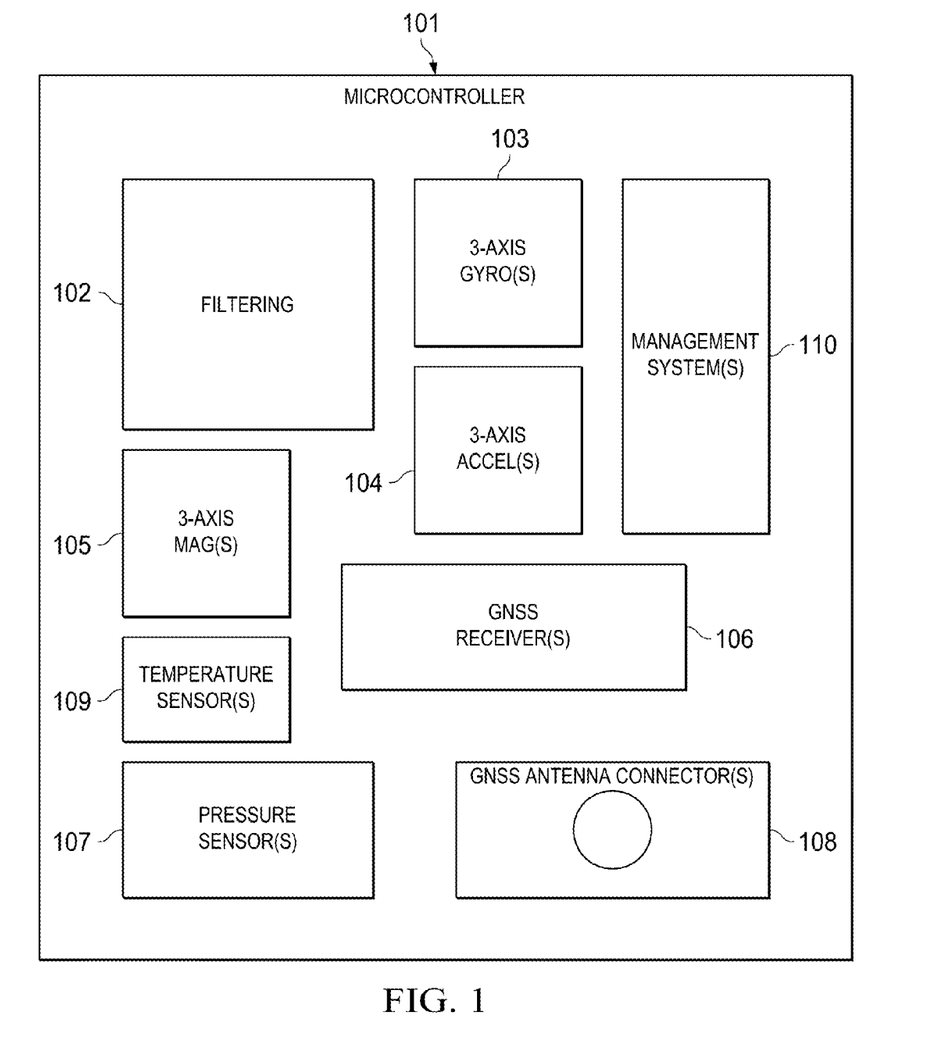
FIG. 1 is a block diagram of a navigation system in accordance with an illustrative embodiment.

Referring now to the illustrative embodiments, in FIG. 1 there is shown a system 100 including a PCB 101 with connections to one or more microprocessors 102, gyroscopes 103, accelerometers 104, magnetometers 105, one or more GNSS receivers 106, pressure sensors 107, one or more GNSS antenna connectors 108, one or more temperature sensors 109, and one or more power regulation and management systems 110.

In one embodiment, the PCB 101 may be configured in a surface mount or aluminum enclosed embodiment. The PCB 101 and systems may be configured to be accurate and are calibrated for a temperature range (i.e. −40 C.-+85 C.). The system may be self-powered (e.g. battery, fuel cell, solar cells, ultra-capacitor, etc.) or may be powered by a connected system. In another embodiment, the PCB 101 may represent a flexible substrate and electronics. For example, the system 100 may be formed from a flexible printed circuit (e.g. FFCs, FPCs, etc.) or substrate.

In one embodiment, the microprocessors 102 may include one or more processing devices. The microprocessors 102 are circuitry or logic enabled to control execution of a set of instructions, algorithms, processes, logic, applications, commands, or code. The microprocessors 102 may be processors, microcontrollers, digital signal processors, field-programmable gate arrays (FPGAs), application-specific integrated circuits (ASIC), central processing units, or other devices suitable for controlling an electronic device including one or more hardware and software elements, executing software, instructions, algorithms, processes, logic, programs, and applications, converting and processing signals and information, and performing other related tasks. In one embodiment, the firmware or software of the microprocessors 102 or other logical components of the system 100 may be updated or reprogrammed. For example, the system 100 may be updated to compensate for local/regional environmental conditions. The system 100 may also be configured to output new data, information, or measurements. An interface, connectors, or pin set may be utilized to communicate with the microprocessors 102 or other logic of the system 100. The microprocessors 102 may each be a single chip or integrated with other computing or communications elements.

The microprocessors 102 may also include a memory or a separate memory may be connected to the PCB 101. The memory is a hardware component, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums.

The system 100 may include any number of sensors. The gyroscopes 103 are devices for measuring the angular rate of the system 100 in three dimensions. The accelerometers 104 may be three-axis measurement sensors for measuring acceleration. The magnetometers 105 are sensors for measuring magnetic fields and changes in magnetic fields in three dimensions. The pressure sensors 107 are sensors for measuring pressure in the environment of the system 100. The GNSS receivers 106 are devices and modules for measuring position, attitude, velocity, time, pseudorange, carrier phase, signal-to-noise ratio (SNR), and/or pseudorange rate (e.g. Doppler shift of the GNSS carrier signal). The GNSS components including the GNSS receivers 106 may be configured to communicate with US based global positioning system (NAVSTAR), Russian GLONASS, China based Beidou navigation system, global compass navigation system, European Union Galileo positioning system, or other developing global or regional navigation systems (e.g. India, France, Japan, etc.). As a result, the system 100 may be utilized in geographically diverse locations with full functionality and interoperability.

The system 100 may further include GNSS antenna connectors 108 configured to receive GNSS radio frequency (RF) data. The temperature sensors 109 are sensors for sensing the temperature of the interior or exterior of the system 100, or remotely located components. Each of the components of the system 100 may be mounted to the surface of the PCB 101. The various components and devices of the system 100 may be connected utilizing leads, wires, solder, sockets, receptacles, or other communications mediums.

The GNSS antenna connectors 108 may connect to a GNSS antenna (not shown). The GNSS antenna may be integrated with the system 100 or separately connected. For example, the GNSS antennas may include active or passive implementations, such as patch, helical, and dipole antennas configured to receive the frequency or range of frequencies of the applicable GNSS system or systems. In one embodiment, the GNSS antenna may include a signal amplifier integrated into the antenna. A number of GNSS antenna connectors 108 and GNSS receivers 106 may be utilized as well as antennas to simultaneously make different measurements, verify information, or perform additional analysis.

The system 100 may be configured to perform timing and sensor sampling, calibration compensation (e.g. real-time sensor bias compensation, individual sensor calibration, etc.), magnetic compensation, active disturbance rejection (i.e. implementation of disturbance rejection algorithms), application specific tuning, and filtering (i.e. active filter tuning, Kalman filtering). The system 100 may determine information, such as position (e.g. output in reference frames such as Earth-Centered Earth-Fixed (ECEF), North-East-Down (NED), Latitude Longitude Altitude (LLA), etc.), velocity (e.g. ECEF, NED, etc.), attitude (e.g. Yaw/Pitch/Roll, Quaternion, Direction Cosine Matrix (DCM), etc.), gravity, linear acceleration, bias compensated angular rates, gyro measurements, and magnetic measurements. The system 100 may also include a compass. In another embodiment, the system 100 may include one or more Wi-Fi, Bluetooth, near field communication, or other wireless receiver(s)/sensor(s) for receiving and processing wireless signals, communicating data and information, or performing wireless triangulation and proximity detection.

As noted above, the system 100 may further include any number of memories, buffers, or caches (not shown) for permanently or temporarily storing data and information read by any of the sensory systems in communication with the PCB 101 or processed by the microprocessors 102. For example, the memories may be utilized to perform logging of the sensory measurements. In one embodiment, the system 100 may include MEMS inertial sensors that allow the PCB 101 to be manufactured and housed in a single plane. As a result, the three-dimensional footprint of the system 100 may be reduced. The MEMS sensors may be small solid state devices mounted to the PCB 101.

The microprocessors 102 may process, analyze and digitally filter data from each of the gyroscopes 103, accelerometers 104, magnetometers 105, GNSS modules 106, pressure sensors 107, temperature sensors 109, to produce inertial attitude (orientation), position and velocity calculations and estimates, with respect to an inertial or pseudo-inertial reference frame, of the object or system to which the system 100 is mounted or embedded. In addition, the microprocessors 102 may process, analyze and digitally filter data from each of the gyroscopes 103, accelerometers 104, magnetometers 105, GNSS receivers 106, pressure sensors 107 and/or temperature sensors 109, to calculate other inertial data that may be used to enhance or adjust such inertial attitude, position and velocity estimates, including but not limited to accelerometer bias and gyroscope bias. Additionally, the individual components attached to the PCB 101 may be calibrated to correct for errors due to changes in the environment (e.g. temperature), including but not limited to bias, scale factor, misalignment and gyroscope g-sensitivity. In one embodiment, the attitude accuracies are improved by the addition of the position and velocity measurements. The unprocessed GNSS position and velocity measurements may be improved by the gyroscopes 103, accelerometer 104, and pressure sensors 107 and associated measurements.

In one embodiment, when the system 100 is in motion, the heading and angle may be determined by comparing the position and velocity measurements to the measurements taken by the accelerometers 104, such that the magnetometers 105 may be ignored by the INS algorithm.

Each of the gyroscopes 102, accelerometers 103, magnetometers 104, GNSS receivers 106 and pressure sensors 107 may be MEMS-based components. The components of the system 100 may be connected to the PCB 101 in any number of design configurations. In one embodiment, the components of FIG. 1 may be connected by wires, busses, traces, sockets, pins, wires, or other connection mediums. For example, a number of busses may be connected to the microprocessors 102 for processing raw or formatted data or information.

In another embodiment, the PCB 101 may include one or more wireless transceivers for sending data and information utilizing any number of standard or proprietary standards, formats, or protocols. For example, the PCB 101 may include a Bluetooth, NFC, or Wi-Fi transceiver. The system 100 of FIG. 1 may be a system-on-a-chip that may be integrated with or connected to other circuitry, devices, or systems.

Figure 2:
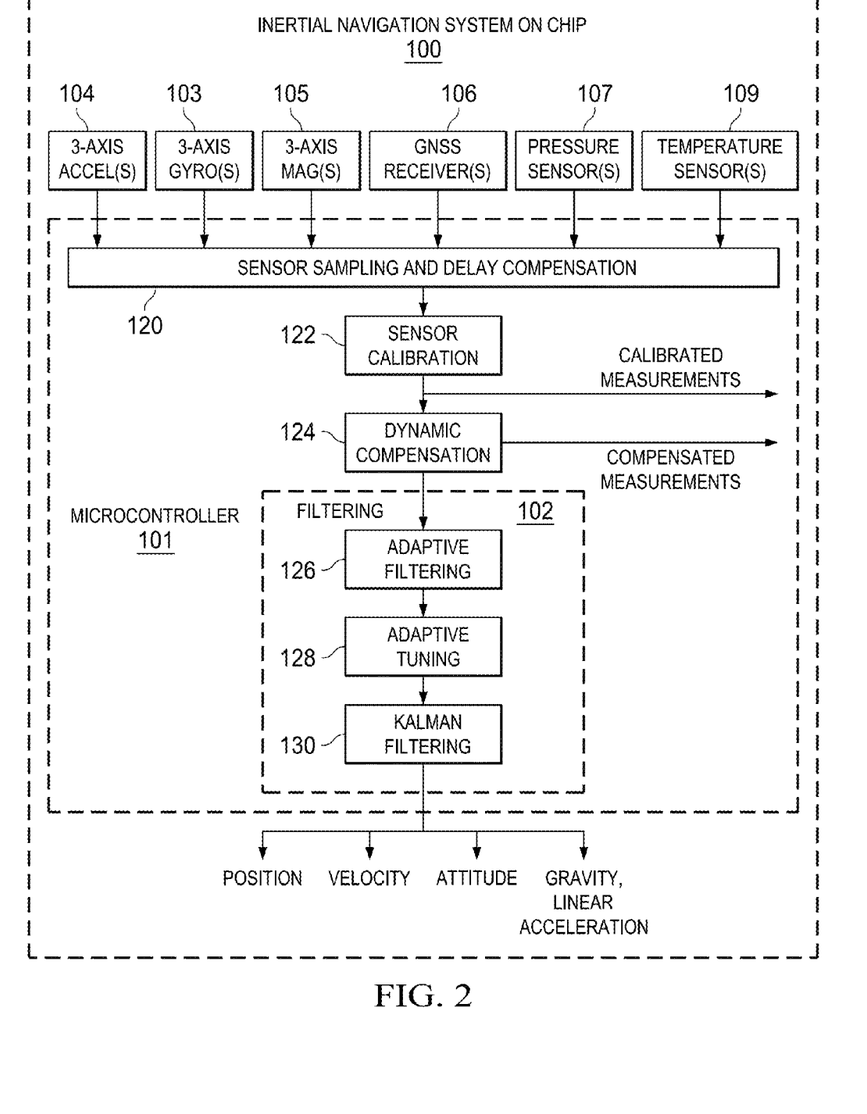
FIG. 2 is a block diagram of the navigation system in accordance with an illustrative embodiment.

FIG. 2 is a block diagram of the navigation system 100 in accordance with an illustrative embodiment. FIG. 2 provides additional information regarding the system 100 functions and components including the PCB 101, microprocessor 102, gyroscopes 103, accelerometers 104, magnetometers 105, one or more GNSS receivers 106, pressure sensors 107, one or more GNSS antenna connectors 108, one or more temperature sensors 109, and one or more power regulation and management systems 110.

In one embodiment, measurements from the sensors 104-109 are sampled by the microprocessor 102. For example, the sensor measurements may be communicate digital values or analog values sampled using an analog-to-digital (A/D) conversion process. The microprocessor 102 includes a sensor sampling and delay compensation logic 120, sensor calibration logic 122, dynamic compensation logic 124, adaptive filtering logic 126, adaptive tuning logic 128, and Kalman filtering logic 130. In one embodiment, the components of the microprocessor 102 may be implemented by hardware logic. In another embodiment, the modules 120-130 may represent software modules executed by the microprocessor 102. In addition, any number of combinations of hardware and software may be utilized by the microprocessor 102. In yet another embodiment, the microprocessor 102 may represent a field programmable gate array (FPGA) or other programmable logic that may be updated from time to time without completely replacing the navigation system 100.

The sensor sampling and delay compensation logic 120 may be utilized to sample the signals and perform delay compensation of the measurements of the sensors 104-109. In one embodiment, delay compensation may be achieved by accounting for the relative delays or latencies between the different sensors when considering when the sensor data should be considered valid, allowing for correct time-based correlation of the different sensor data in further processing. The sensor calibration logic 122 may store parameters and information that may be accessed by the sensor sampling and delay compensation logic 120.

In one embodiment, the sensor calibration is a one-time process at the time of integration that may compare outputs from the individual sensors to highly accurate measurements or known environmental conditions to calculate compensation parameters that minimize measurement error sources that vary by individual sensor and sensor type, which may include bias, non-linearity, misalignment, vibration sensitivity, linear acceleration sensitivity, and temperature dependence among others. The process may include subjecting the individual sensors to known orientations, angular rates, magnetic environments, environmental temperatures, environmental pressures, environmental humidities, vibrations, shock environments, linear accelerations, angular accelerations, among other physical processes as well as subjecting the sensors to multiple of these processes at the same time. In another embodiment, sensor calibration, recalibration, or verification may be selected and implemented by the calibration logic 122 any number of times. In addition, the dynamic compensation logic 124 may be applied to the calibrated measurements resulting in compensated measurements from the sensors 104-109. The dynamic compensation may compare the combined calibrated measurements from the various sensor types to kinematic and dynamic models to calculate and compensate for error sources that may vary with time. The error sources may include biases, scale factors, temperature and humidity dependencies, and so forth.

The adaptive filtering logic 126 may utilize any number of attitude estimation algorithms to perform digital filtering of the measured imports to improve immunity to high-frequency disturbances, such as vibration and electromagnetic induced interference. In one embodiment, the adaptive filtering logic may include one or more algorithms that are stored or accessed from the microprocessor 102. The adaptive filtering logic may intelligently estimate and apply a minimal amount of digital filtering in response to the time history of the received input measurements. For example, the adaptive filtering logic may detect a vibrational disturbance present in the inertial data and apply digital filtering to attenuate the effects of the disturbance on the measurements, but not apply the digital filtering when no disturbance is detected. The adaptive filtering logic 126 may eliminate the need to manually tune the digital filtering stages for different sensors and applications and provides immunity to high-frequency disturbances while ensuring minimal measurement latency.

The adaptive tuning logic 128 may be utilized to perform high performance estimation in a variety of applications. For example, the adaptive tuning logic 128 may be utilized to perform general-purpose attitude estimation requiring a real-time knowledge of and certainty in the magnetic and acceleration input measurements. For example, if the sensors 104-109 are subject to a wide range of disturbances, the system may have difficulty finding a single set of tuning parameters that achieve the desired level of performance under varying conditions. The adaptive tuning logic 128 provides an intelligent toolbox for estimation of the magnetic and acceleration measurement uncertainties based upon the time history output of the attitude estimation algorithm. The adaptive tuning logic 128 may simplify or eliminate manual tuning of the attitude estimator for different types of sensors. With adapting tuning enabled, the adaptive tuning logic may be configured to provide a consistent level of overall performance across a wide range of applications.

The Kalman filtering logic 130 may also be referred to as linear quadratic estimation (LQE) that uses a series of measurements observed over time, containing noise and other inaccuracies, and produces estimates of unknown variables that tend to be more precise than those based on a single measurement alone. The Kalman filter logic 130 may be utilized recursively on streams of noisy input data received from the sensors 104-109 to produce a statistically optimal estimate of the underlying navigation system state.

Once sensory measurements are calibrated, compensated, filtered, and tuned as shown by the microprocessor 102, the calibrated and compensated measurements may be output as well as the position, velocity, attitude, gravity, and linear acceleration. In addition, any number of other measurements may be communicated by the navigation system 100 based on the input of the sensors 104-109 and the processing performed by the microcontroller 102.

Figure 3:
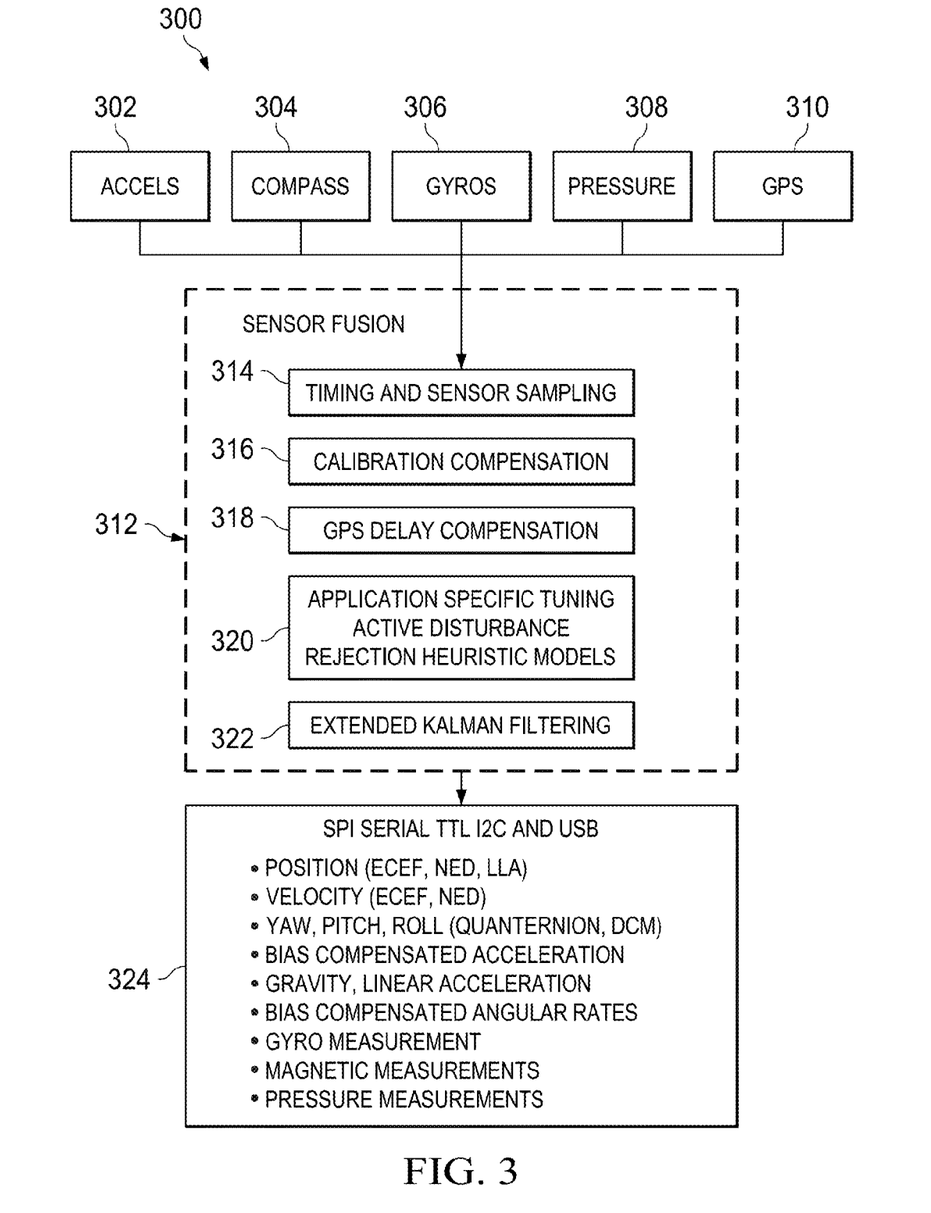
FIG. 3 is a block diagram of the navigation system in accordance with an illustrative embodiment.

FIG. 3 is a block diagram of the navigation system 300 in accordance with an illustrative embodiment. FIG. 3 illustrates the sensor inputs 302-310 (altogether the "sensor input" 311) taken by the onboard components of the navigation system 300 as well as the variety of processes and functions that may be applied to the measurements 311 resulting in accurate position, velocity, and attitude calculation/estimates. In one embodiment, the process described with regard to FIG. 3 may be performed sequentially. In another embodiment, the different steps may be performed simultaneously, concurrently, or in parallel based on the individual conditions.

The sensor input 311 from each of the onboard components and sensors may be sampled (step 314) at certain rates and adjusted to compensate for any latencies, errors, or delays in the receipt of the sensor input 311.

In addition, MEMS inertial sensors may be subject to several common sources of errors, such as bias, scale factor, misalignments, temperature dependencies, and g-sensitivity. In one embodiment, each axis of each accelerometer, gyroscope, and magnetometer may have a unique temperature and humidity dependency, which if neglected, may degrade the overall position, velocity, and attitude calculations. For example, dynamic factors or inputs, such as attitude with respect to gravity, and numerous other factors may affect the calculations performed by the navigation system 300. The individual components of the navigation system 300 may be calibrated to compensate for errors due to changes in the environment (step 316) (e.g. temperature, pressure, humidity, etc.), including but not limited to, bias, scale factor, misalignment, and gyroscope g-sensitivity. For example, once the individual components of the navigation system 300 have been installed or connected to a PCB, a calibration process may be conducted to minimize error sources.

In one embodiment, compensation parameters or factors calculated during these calibrations may be stored by the navigation system 300 and digitally applied to the real time measurements that are output by the navigation system 300. The navigation system 300 may include a database or tables for calculating the compensation parameters for different conditions that the navigation system 300 may face. In another embodiment, the navigation system 300 may upload or download new compensation parameters that may be periodically adjusted for the condition or configuration of the navigation system 300.

The measurements from the on board GNSS receiver may be received by the microprocessor. The measurements and GNSS data may be compensated (step 318) to account for delays, the discrepancies in timing, and receipt of the GNSS information. The navigation system 300 may utilize any number of other delay compensation techniques as well as application-specific tuning, active disturbance rejection, and heuristic models (step 320). Extended Kalman filtering may also be performed (step 322). As shown in FIGS. 2 and 3, the measurements may be cumulatively processed as described to provide the most accurate estimate outputs possible.

Sensory combination 312 represent the combination or fusion of sensor input 311 and measurements, position, velocity, and attitude that may be output by the navigation system 300 as output. The sensory combination 312 may be utilized to perform timing and sensor sampling 314, calibration compensation 316, GNSS delay compensation 318, application specific tuning, active disturbance rejection, and heuristic models 320, and extended Kalman filtering 322.

System outputs 324 may be communicated to one or more external devices, systems, or equipment. For example, the system 100 may include one or more ports or adapters, such as a Serial Peripheral Interface Bus (SPI), multimaster serial single-ended computer bus, serial output port, USB, mini-USB, or other output ports, standards, or protocols. The system outputs 324 may include position, velocity, attitude (e.g. yaw/pitch/roll, quaternion, DCM, etc.), bias compensated acceleration, gravity, linear acceleration, bias compensated angular rates, angular velocity, magnetic fields, pressure, and temperature. The system outputs 324 may be communicated as Earth Centered Earth-Fixed (ECEF) (conventional terrestrial), North East Down (NED), or latitude longitude altitude (LLA), or other reference frames or coordinate systems.

Figure 4:
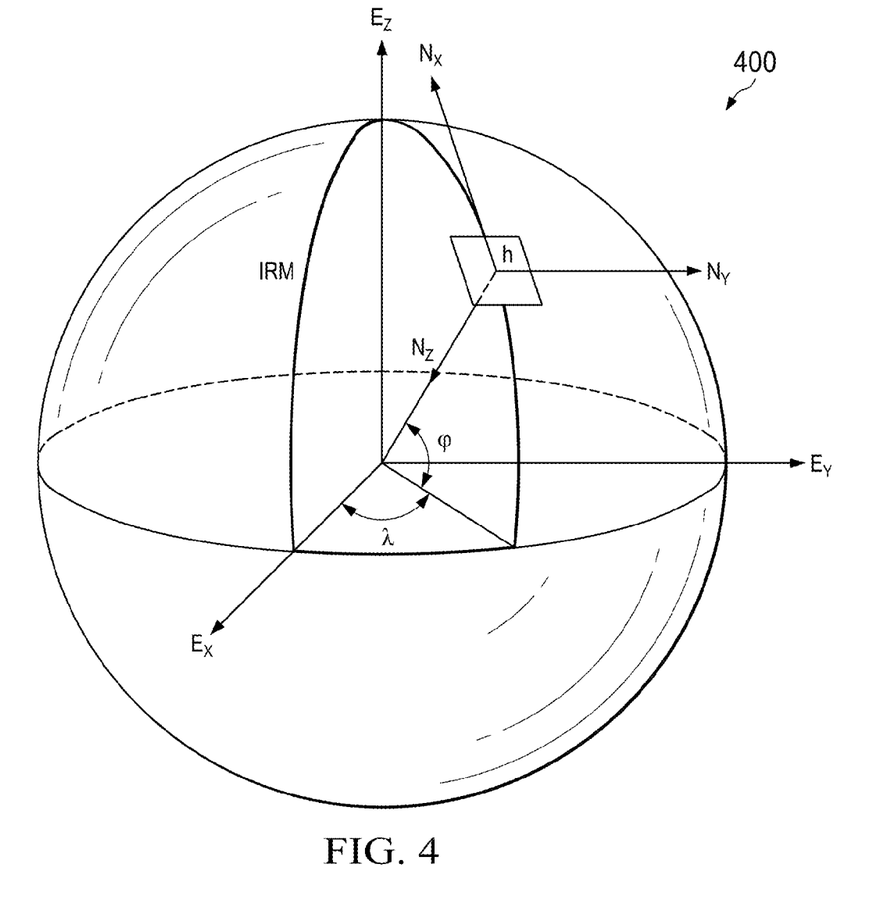
FIG. 4 is a pictorial representation of reference frames in accordance with an illustrative embodiment.
Figure 5:
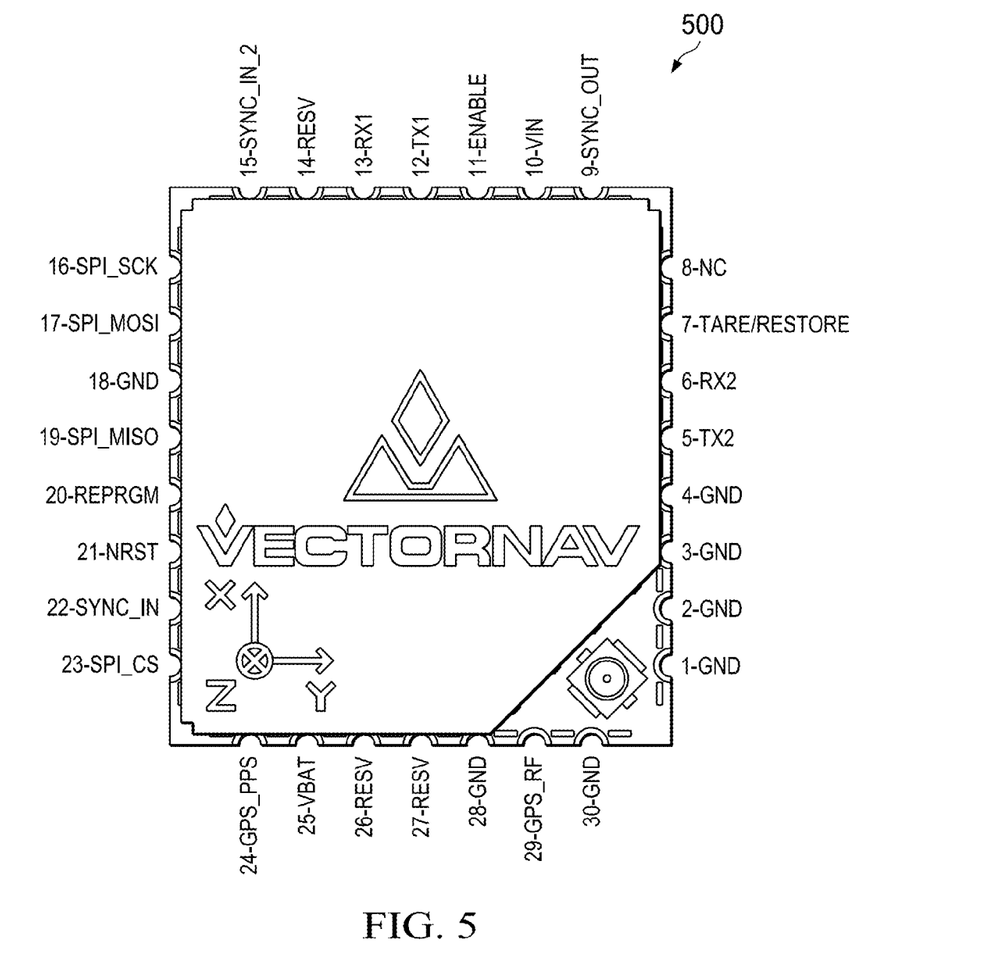
FIG. 5 is a pictorial representation of a navigation system on a chip in accordance with an illustrative embodiment.
Figure 6:
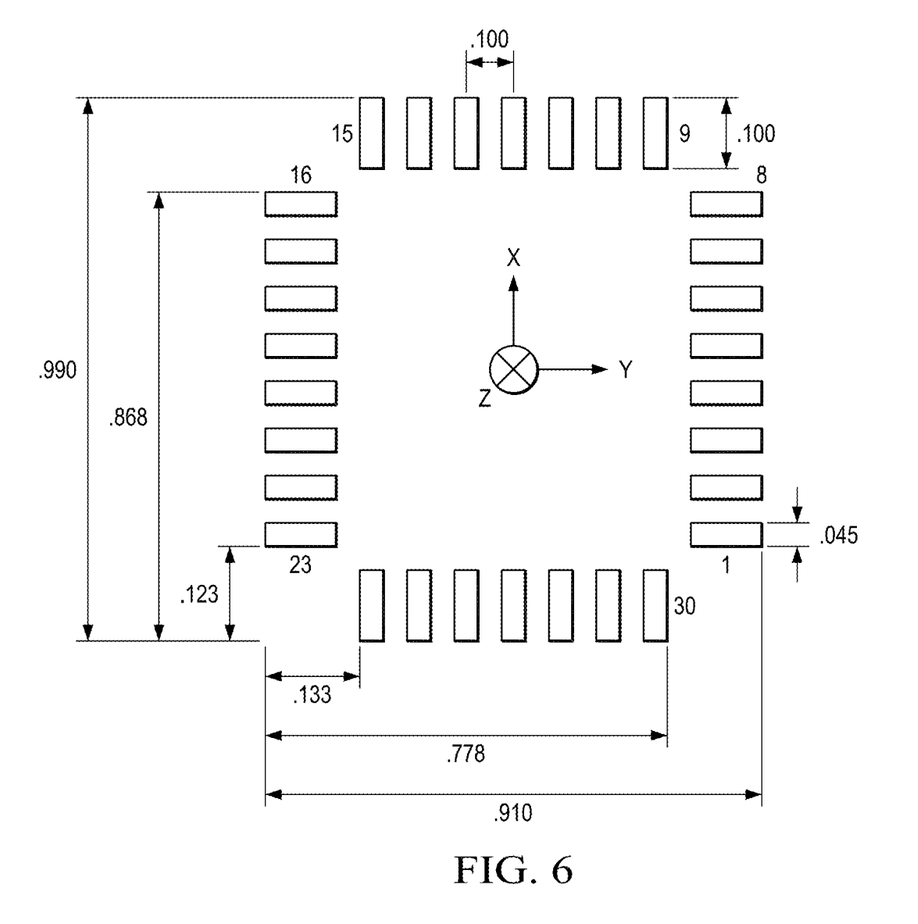
FIG. 6 is a pictorial representation of pad spacing in accordance with an illustrative embodiment.

In one embodiment, the system outputs 324 of the position may be performed utilizing the ECEF reference frame (see FIG. 4, Ex, Ey, Ez). ECEF may utilize a right-handed, Cartesian, non-inertial frame with origin located at the center of Earth. The ECEF reference frame is fixed and rotates with the earth. As shown it has a positive x-axis that aligns with the International Earth Rotation and Reference Systems Service (IERS) Reference Meridian. The Positive z-axis aligns with the IERS Reference Pole (IRP) that points toward the North Pole. The y-axis similarly aligns completing the right-handed system. The x, y, and z axis may align with the World Geodetic System most updated revision, such as WGS 84.

The system outputs 324 may also be output utilizing the NED reference frame (see FIG. 4, Nx, Ny, Nz). The NED may utilize a right-handed, Cartesian, non-inertial, geodetic frame with origin located at the surface of Earth that is fixed and rotates with the Earth. The positive x-axis points toward North, tangent to the WGS 84 ellipsoid, positive y-axis points toward East, tangent to WGS 84 ellipsoid, and positive z-axis points down into the ground completing the right-handed system.

In another embodiment, the system outputs 324 may be output utilizing the LLA reference frame (see FIG. 4, λ, φ, h). The LLA may utilize non-inertial, geodetic frame with origin located at the surface of the Earth (WGS 84 ellipsoid). Latitude may be defined as the angle from the equatorial plane to a line normal to the surface of the WGS 84 ellipsoid at the determined location of the navigation system 300. Longitude may be defined as the East-West angular displacement measured positive to the east from the IERS reference Meridian to the location of the navigation system 300. Altitude may be defined as the distance from the WGS 84 ellipsoid to the location of the navigation system 300.

FIG. 5-8 are pictorial representations of a packaged navigation system 500 in accordance with an illustrative embodiment. The packaged navigation system 500 may be configured to be mounted to a PCB, circuitry, or other system. The packaged navigation system may include a case that protects and shields the internal components. In one embodiment, the case is weatherproof, waterproof, and shockproof. The packaged navigation system may include one or more external (digital or analog) connectors for communicating with other components. For example, the digital interface may be a serial TTL or SPI interface or other similar interface.

The packaged navigation system 500 may include pins, mounting holes, brackets, ports, or other connectors for securing or physically and electrically connecting the packaged navigation system to another device, system or component. For example, the packaged navigation system 500 may represent an integrated circuit or chip with pins for connection to any number of other devices or systems.

Figure 7:
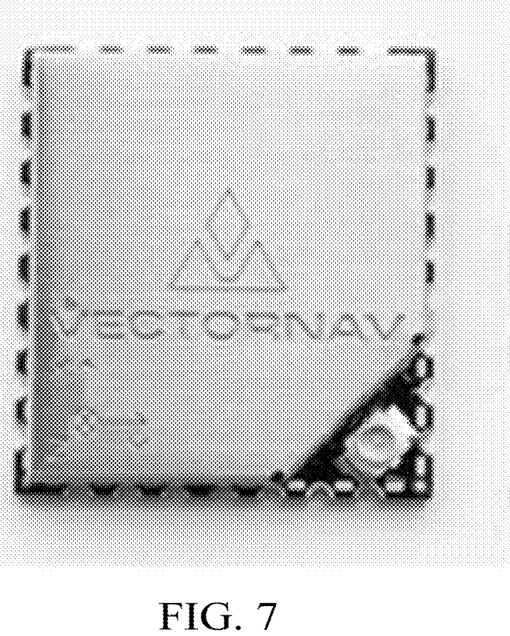
FIGS. 7-8 are pictorial representations of the navigation system on chip in accordance with an illustrative embodiment.
Figure 8:
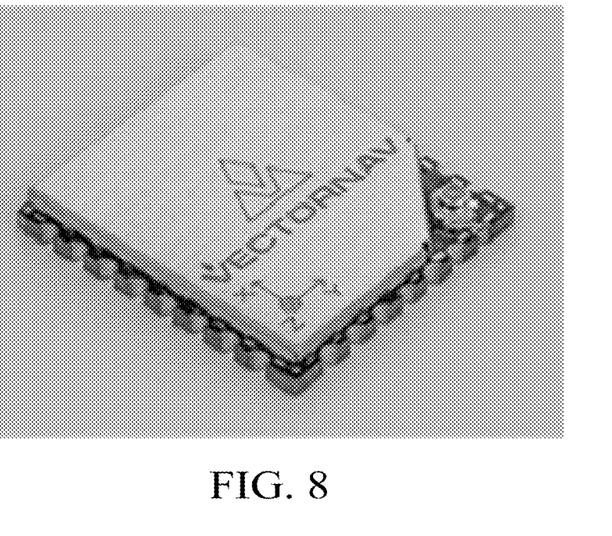

FIGS. 7-8 are pictorial representations of the packaged navigation system 500 shown as a system on a chip. In one embodiment, the packaged navigation system 500 may be encompassed in a PCB that may be integrated with other components. For example, the packaged navigation system 500 packaged on the PCB may be approximately the same size as a quarter (22×24×3 mm, 3 grams, 30-pin LGA). The packaged navigation system 500 may require an input voltage of 3.2-5.5 V and 65 mA (215 mW @ 3.3V) with a 5 μA standby mode. The size of the packaged navigation system 500 may be similarly increased or decreased based on the application. For example, the footprint and size of the packaged navigation system 500 may be utilized for wearable electronics (e.g. eye glasses, watches, etc.), micro drones, smart bullets, or so forth.

The illustrative embodiments may be well suited for missiles, projectiles, guided munitions, vehicles, commercial electronics, and other devices in which three-dimensional designs are systems are unstable due to the high shock and stress conditions. For example, some existing navigation systems may fail based on their three-dimensional designs to house the respective components during launch or flight of a missile. The flat, one dimensional design of it inertial navigation system on a chip allows for each component to endure high shock and stress with no damage or little or no adverse effect to the output of the navigation system.

While the foregoing written description of the illustrative embodiments enable one of ordinary skill to make and use what is considered presently to be the best mode thereof, those of ordinary skill will understand and appreciate the existence of variations, combinations, and equivalents of the specific embodiment, method, and examples herein. The embodiments are therefore not to be limited by the above described embodiment, method, and examples.

What is claimed:

1. A system on a chip for inertial navigation, the system comprising:
   a printed circuit board (PCB), wherein the PCB is on a single plane, and wherein the PCB comprises:
      a plurality of sensors configured to measure position, acceleration, angular rate, magnetic fields, pressure, and temperature as measurements; and
      one or more processors in communication with the plurality of sensors configured to process the measurements to determine and output a position, velocity, attitude, and acceleration, wherein the PCB, the plurality of sensors, and the one or more processors are all integrated on a single chip.

2. The system on a chip of claim 1, wherein the plurality of sensors include at least one or more gyroscopes, one or more accelerometers, one or more magnetometers, a global navigation satellite system (GNSS) receiver, one or more pressure sensors, and one or more temperature sensors.

3. The system on a chip of claim 1, wherein the PCB, plurality of sensors, and one or more processors are substantially within a single plane.

4. The system on a chip of claim 1, wherein the system on a chip is integrated with another device.

5. The system on a chip of claim 1, wherein the PCB further comprises:
   one or more antenna connectors for connecting a GNSS antenna to one or more of the plurality of sensors.

6. The system on a chip of claim 1, wherein the one or more processor perform sensor calibration for the plurality of sensors utilizing at least temperature of the system on a chip.

7. The system on a chip of claim 1, wherein the one or more processors perform dynamic filtering of the measurements.

8. The system on a chip of claim 1, wherein the one or more processors perform adaptive tuning of the measurements utilizing magnetic and acceleration measurements, wherein adaptive tuning dynamically changes a tuning amount to compensate the measurements utilizing the magnetic and acceleration measurements.

9. The system on a chip of claim 1, wherein the system on a chip is approximately the same size as a quarter.

10. The system on a chip of claim 1, wherein the output further includes gravity and linear acceleration.

11. A navigation system on a chip comprising:
   a plurality of sensors configured to process sensor measurements including at least one or more gyroscopes, one or more accelerometers, one or more magnetometers, a global navigation satellite system (GNSS) receiver;
   one or more pressure sensors, and one or more temperature sensors;
   one or more microprocessors configured to process the sensors measurements by performing compensation for the plurality of sensors utilizing one or more conditions of the navigation system, dynamic filtering of the measurements, and tuning of the measurements, wherein the one or more microprocessors output a position, velocity, attitude, and acceleration, wherein all components of the navigation system are integrated on a single chip.

12. The navigation system on a chip according to claim 11, further comprising:
   one or more GNSS antenna connectors for connecting to a GNSS antenna.

13. The navigation system on a chip according to claim 11, further comprising:
   a PCB, wherein the one or more microprocessors and the plurality of sensors operate in a single plane.

14. The navigation system on a chip according to claim 11, wherein the dynamic filtering includes linear quadratic estimation to estimate desired unknown quantities.

15. The navigation system on a chip according to claim 11, wherein the one or more processors perform sensor calibration for the plurality of sensors utilizing at least temperature of the navigation system.

16. The navigation system on a chip according to claim 11, wherein the output further includes gravity and linear acceleration.

17. The navigation system on a chip according to claim 11, wherein the one or more microprocessors perform sensor calibration for the plurality of sensors utilizing at least temperature of the navigation system on a chip, and wherein the one or more microprocessors perform dynamic filtering of the sensor measurements.

18. A method for providing navigation information utilizing a navigation system on a chip, the method comprising:
   receiving, at the navigation system on the chip, measurements from a plurality of sensors including at least one or more gyroscopes, one or more accelerometers, one or more magnetometers, a global navigation satellite system (GNSS), one or more pressure sensors, and one or more temperature sensors;
   performing, at the navigation system on the chip, delay compensation of the measurements;
   performing, at the navigation system on the chip, tuning of the measurements; and
   filtering, at the navigation system on the chip, the measurements to output an attitude, position, and velocity.

19. The method according to claim 18, wherein the measurements are sampled at a predefined rate, and wherein the measurements are compensated for temperature.

20. The method according to claim 18, wherein the navigation system on a chip operates on a single plane.

* * * * *